United States Patent [19]
Aoki et al.

[11] Patent Number: 5,237,148
[45] Date of Patent: Aug. 17, 1993

[54] DEVICE FOR MANUFACTURING A NOZZLE AND ITS MANUFACTURING METHOD

[75] Inventors: Hikoharu Aoki; Kazushi Fukuda, both of Nagoya, Japan

[73] Assignee: Brother Kogyo Kabushiki, Nagoya, Japan

[21] Appl. No.: 770,358

[22] Filed: Oct. 3, 1991

[30] Foreign Application Priority Data

Oct. 4, 1990 [JP] Japan .................................. 2-267120

[51] Int. Cl.$^5$ ............................................. B23K 26/00
[52] U.S. Cl. ............................. 219/121.7; 219/121.71
[58] Field of Search ........... 219/121.7, 121.71, 121.83, 219/121.62, 121.61

[56] References Cited

U.S. PATENT DOCUMENTS

| | | | |
|---|---|---|---|
| 5,061,839 | 10/1991 | Matsuno et al. | 219/121.83 |
| 5,063,280 | 11/1991 | Inagawa et al. | 219/121.7 |

FOREIGN PATENT DOCUMENTS

| | | | |
|---|---|---|---|
| 0049113 | 11/1984 | Japan | 219/121.71 |
| 2236973 | 4/1991 | United Kingdom | 219/121.71 |
| 2239206 | 6/1991 | United Kingdom | 219/121.7 |

*Primary Examiner*—C. L. Albritton
*Attorney, Agent, or Firm*—Oliff & Berridge

[57] ABSTRACT

A method for manufacturing a nozzle includes a step to change a spot diameter of a laser beam on a plate in which an orifice hole is formed. A device for manufacturing a nozzle includes a laser beam generating device for generating a laser beam, a work head comprising a lens to focus the laser beam on a plate, a driving device to move the work head upward and downward, a position detecting device for sending a signal indicating a position of the work head, and a controlling device for controlling an amount of the laser beam to be applied according to the signal from the position detecting device. The device for manufacturing a nozzle of the present invention changes the spot diameter of the laser beam on the plate. Therefore, the time period for forming an orifice hole in the nozzle can be shortened.

24 Claims, 7 Drawing Sheets

DEVICE FOR MANUFACTURING A NOZZLE AND ITS MANUFACTURING METHOD

BACKGROUND OF THE INVENTION

This invention relates to a device for manufacturing a nozzle utilized in an ink jet printer and its manufacturing method.

Currently, a hole of a nozzle employed in an ink jet device such as a printer has an orifice configuration which gradually tapers, in order to flow liquid ink and discharge it through the hole smoothly. Since such an orifice hole is difficult to manufacture with a conventional drill, so the hole is usually formed by plating or electroforming.

However, since the orifice hole is formed in a plate about 100 $\mu$m in thickness, the orifice hole formed by plating or electroforming is difficult to be formed accurately. Further, forming the orifice hole takes several hours, which makes the mass production of the nozzle impossible and adds to the manufacturing cost.

SUMMARY OF THE INVENTION

An object of the instant invention is to solve the aforementioned problem by providing a method for manufacturing a nozzle utilized in an ink jet printer, in which the time period for manufacturing an orifice hole of the nozzle is shortened.

Another object of the invention is to provide a device for manufacturing a nozzle utilized in an ink jet printer, in which the time period for manufacturing an orifice hole of the nozzle is shortened.

To attain the first object, the method of the present invention comprises a step to change a spot diameter of a laser beam on a plate in which an orifice hole is manufactured.

The second object can be attained by a device comprising a laser beam generating means for generating a laser beam, a work head comprising a lens to focus the laser beam on a plate, a driving means to move the work head upward and downward, a position detecting means for sending a signal indicating a position of the work head, and a controlling means for controlling an amount of the laser beam to be applied according to the signal from the position detecting means.

The nozzle forming device of the present invention thus constructed changes the spot diameter of the laser beam on the plate. Therefore, the time period for forming the orifice hole of a nozzle is shortened.

DETAILED DESCRIPTION OF A PREFERRED EMBODIMENT

A preferred embodiment is now described with reference to the drawings.

Figure 1:
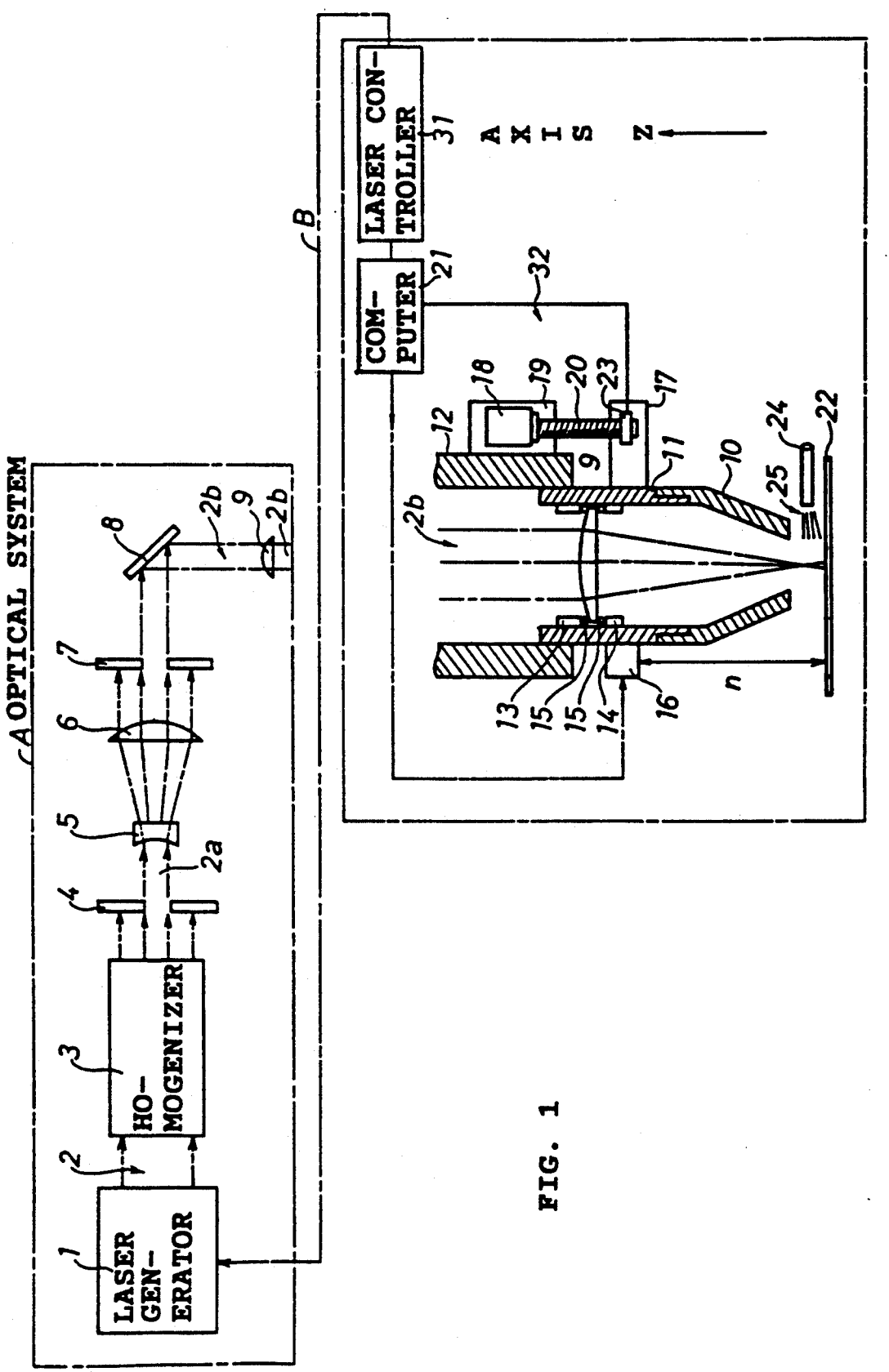
FIG. 1 is a sectional view of an optical system employing excimer laser and a work head for an embodiment of the present invention.

FIG. 1 shows an optical system A which selects highly phase-matched beams from excimer laser beam 2, and a work head B for forming an orifice hole in a plate 22 by directly applying the laser beam 2 to the plate 22.

Referring to the optical system A first, the laser beam 2 generated by a laser generator 1 is uniformed by a homogenizer 3. Only central beams 2a having the same phase of the laser beam 2 go through an aperture 4. The central beams 2a are enlarged by the cooperation of a concave lens 5 and a convex lens 6. Again only beams 2b at the central position of the central beams 2a go through another aperture 7. Then the beams 2b are reflected by a mirror 8 to reach a lens 9.

Turning to the work head B, the lens 9 is fixed to a lens holder 11 via screwable retaining rings 13 and 14 with O-shaped rings therebetween. The lens holder 11 is connected with a nozzle 10. The lens holder 11 slides along the inner surface of a head holder 12. An optical sensor 16 is fixed onto a side of the lens holder 11. The sensor 16 measures a distance n between the sensor 16 and the plate 22. Any type of optical sensor can be utilized if the sensor can measure the distance n.

A driving system controls the sliding speed and position of the lens holder 11 in the direction of a z axis according to a signal from the sensor 16. The driving system comprises a sliding device 32 and a computer 21 for actuating the sliding device 32. The sliding device 32 comprises a driving motor 18, a sliding screw (ball screw) 20 connected to the end of the output axis of the driving motor 18, a female nut 23 for engaging with the sliding screw 20, and an arm 17 for fixing the female nut 23 to the lens holder 11. The driving motor 18 is, for example, a PG motor, which is longitudinally fixed to the head holder 12 via an arm 19. The sliding device 32 thus constructed slides the lens holder 11 in the direction of the z axis, controlling the speed of manufacturing the orifice hole according to the distance n.

Further, assisting gas 25 blows from a pipe 24 under the nozzle 10 to blow off particles of the plate 22 generated by applying the laser beam 2. Inert gas Ar may be employed as the assisting gas 25.

Figure 2:
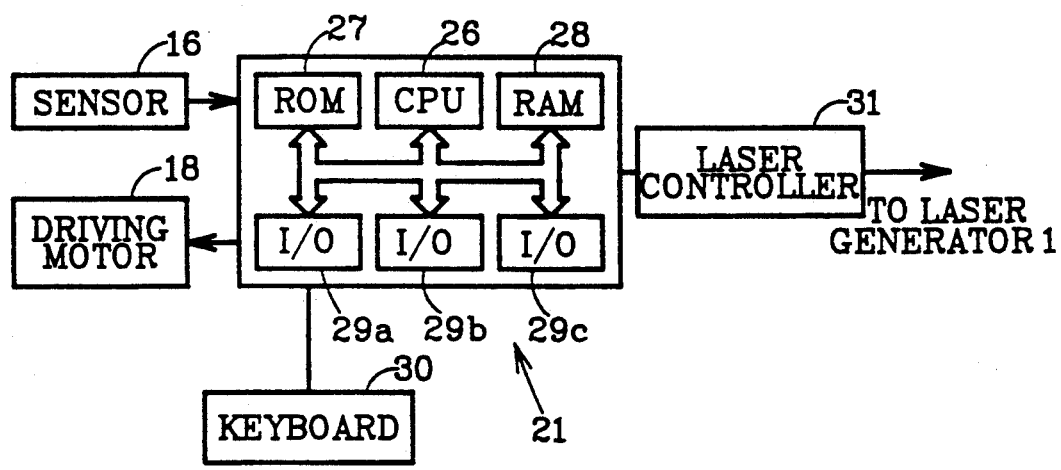
FIG. 2 is a block diagram illustrating a structure of a computer shown in FIG. 1.

In FIG. 2, the computer 21 comprises CPU 26, ROM 27, RAM 28, I/O ports 29a through 29c, and a keyboard 30. The computer 21 controls the slide of the lens holder 11 in accordance with the signal from the sensor 16. The computer communicates with a laser controller 31. The laser controller 31 controls the number of pulse shots of the laser beam 2 to be applied.

Figure 4:
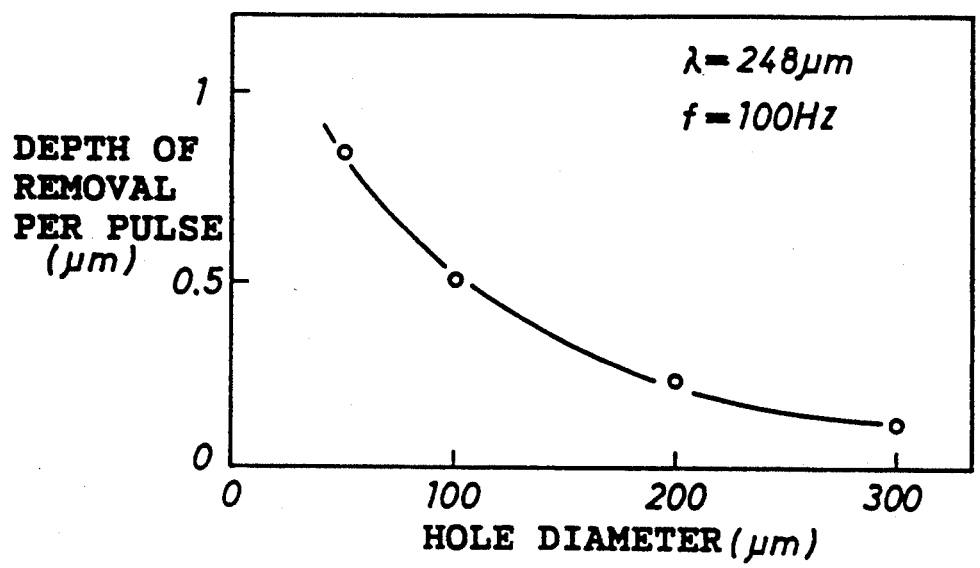
FIG. 4 is a graph showing the relationship between a hole diameter of the orifice hole and a depth of removal by the laser per pulse.

The ROM 27 stores the data for each material employed as the plate 22, and the data for the number of pulse shots required for each laser employed as laser beam 2 to penetrate a unit depth according to the hole diameter. FIG. 4 shows the relationship between the hole diameter of the orifice hole and the depth of removal by the laser beam 2 per pulse. In FIG. 4, KrF excimer laser having wave length λ of 248 μm and frequency of 100 Hz is utilized as the laser beam 2, and the plate 22 is made of Ni. The data in the ROM 27 and the hole configuration determines the number of pulse shots required to penetrate a depth in accordance with the hole diameter. The hole diameter is determined in accordance with an f value and a defocus distance of the lens 9.

Figure 3:
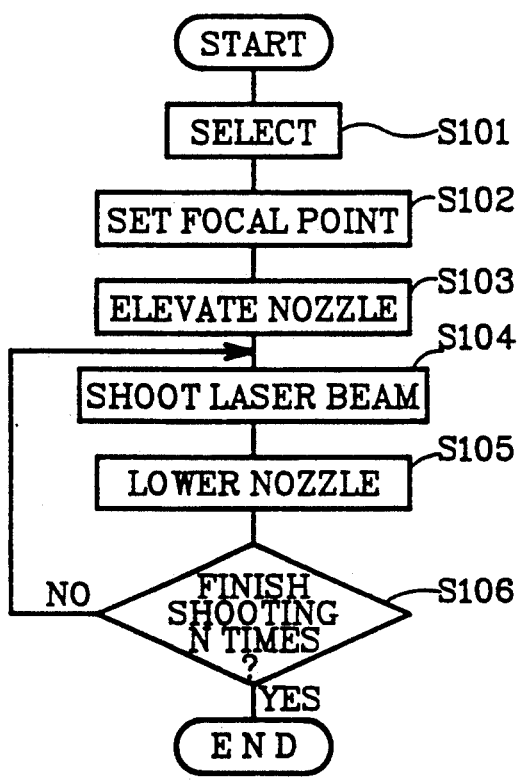
FIG. 3 is a flowchart describing a controlling program of the computer for manufacturing an orifice hole.

The operation of the computer 21 is now described with reference to the flowchart in FIG. 3. The RAM 28 of the computer 21 stores a controlling program illustrated in the flowchart. The RAM 28 also stores the data for the number of pulse shots required for each laser employed as the laser beam 2 to penetrate a depth according to the hole diameter, and the data for each material employed as the plate 22.

Upon operation, the material employed as the plate 22 and the orifice hole (orifice configuration) are selected from the controlling program through the keyboard 30. The CPU 26 establishes this selection (Step 101).

The computer 21 receives the signal from the sensor 16. The signal indicates the distance n between the sensor 16 and the plate 22. According to the signal, the CPU controls the rotation of the driving motor 18 to correspond the focal point of the lens 9 to the surface of the plate 22 (Step 102).

To form the orifice hole selected in Step 101, the lens holder 11 is elevated to a first defocus point corresponding to an initial hole diameter by controlling the driving motor 18 (Step 103).

Figure 7:
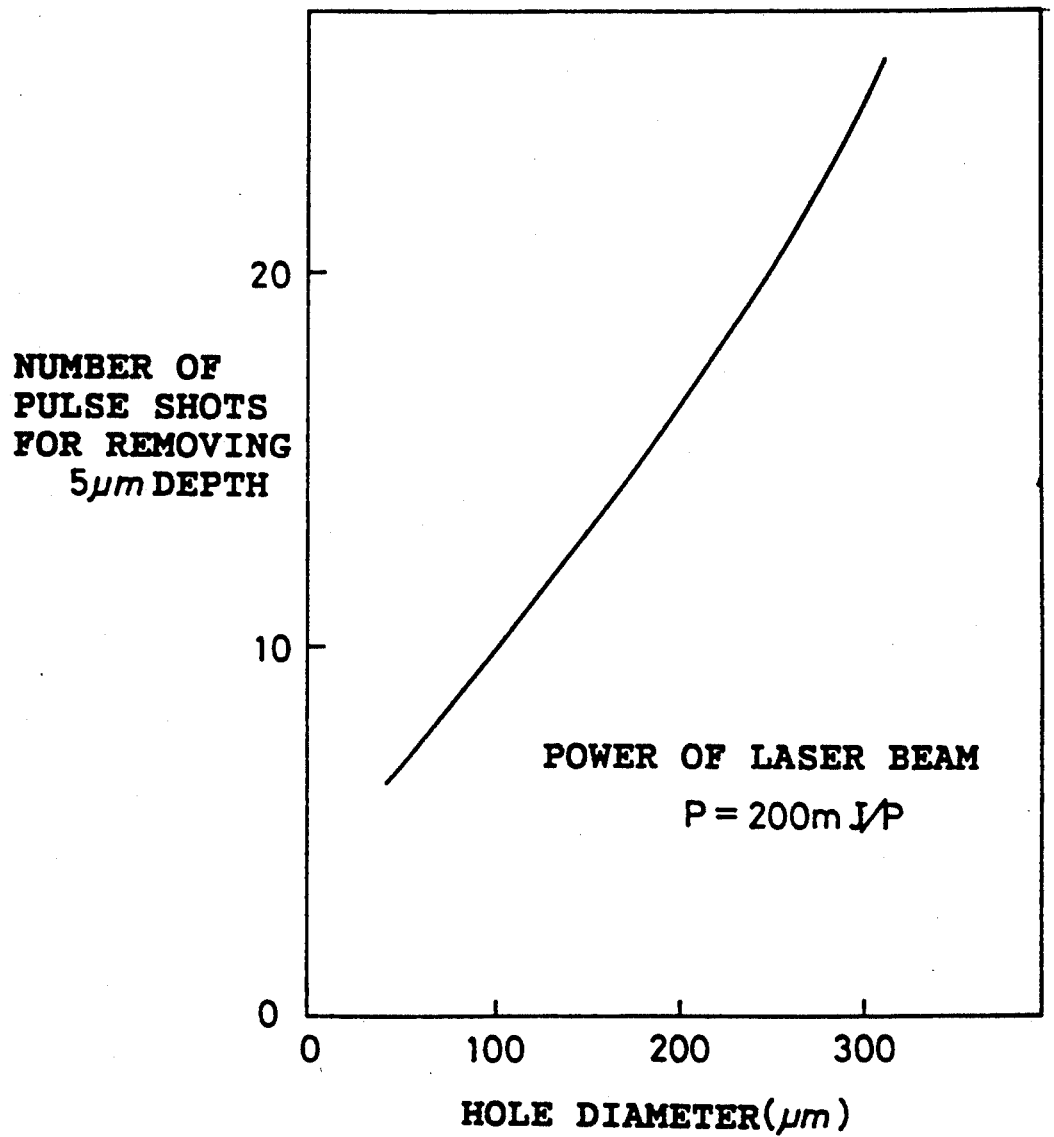
FIG. 7 is a graph showing the relationship between the hole diameter and the number of pulse shots for removing 5 $\mu$m in depth with the power of the laser being fixed.

Then the orifice hole is worked. The computer 21 sends to the laser controller 31 a signal which indicates the number of pulse shots required to penetrate a depth according to the hole diameter. The laser controller 31 drives the laser generator 1 to generate the laser beam 2 having a predetermined pulse shot frequency of 100 Hz. The laser beam 2 is applied to the plate 22 through the optical system A and the work head B (Step 104). In this step, the laser power is 200 mJ per pulse. The hole diameter is gradually made small by controlling the number of pulse shots with the power of the laser beam 2 being fixed. Then the lens holder 11 is lowered by 5 μm in the direction of the z axis (Step 105). The CPU 26 determines whether the Step 104 has executed N times according to the RAM 28 which temporally stores the number of times the Step 104 is executed (Step 106). If no, the process goes back to the Step 104, and the Steps 104 through 106 are repeated until the Step 104 is performed N times. While the Step 104 is performed, the number of pulse shots is controlled according to the relationship between the hole diameter and the number of pulse shots for removing 5 μm with the power of the laser beam 2 being fixed as shown in FIG. 7. The data of the number of pulse shots in accordance with the hole diameter are stored in the RAM 28 in advance. The number of pulse shots are thus changed every time the lens holder 11 is lowered by 5 μm in accordance with the data in the RAM 28.

Figure 5:
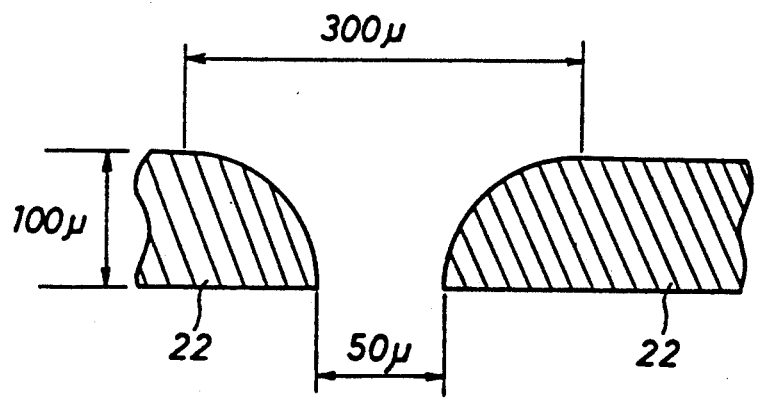
FIG. 5 is a cross-sectional view of the orifice hole formed according to the embodiment.
Figure 6:
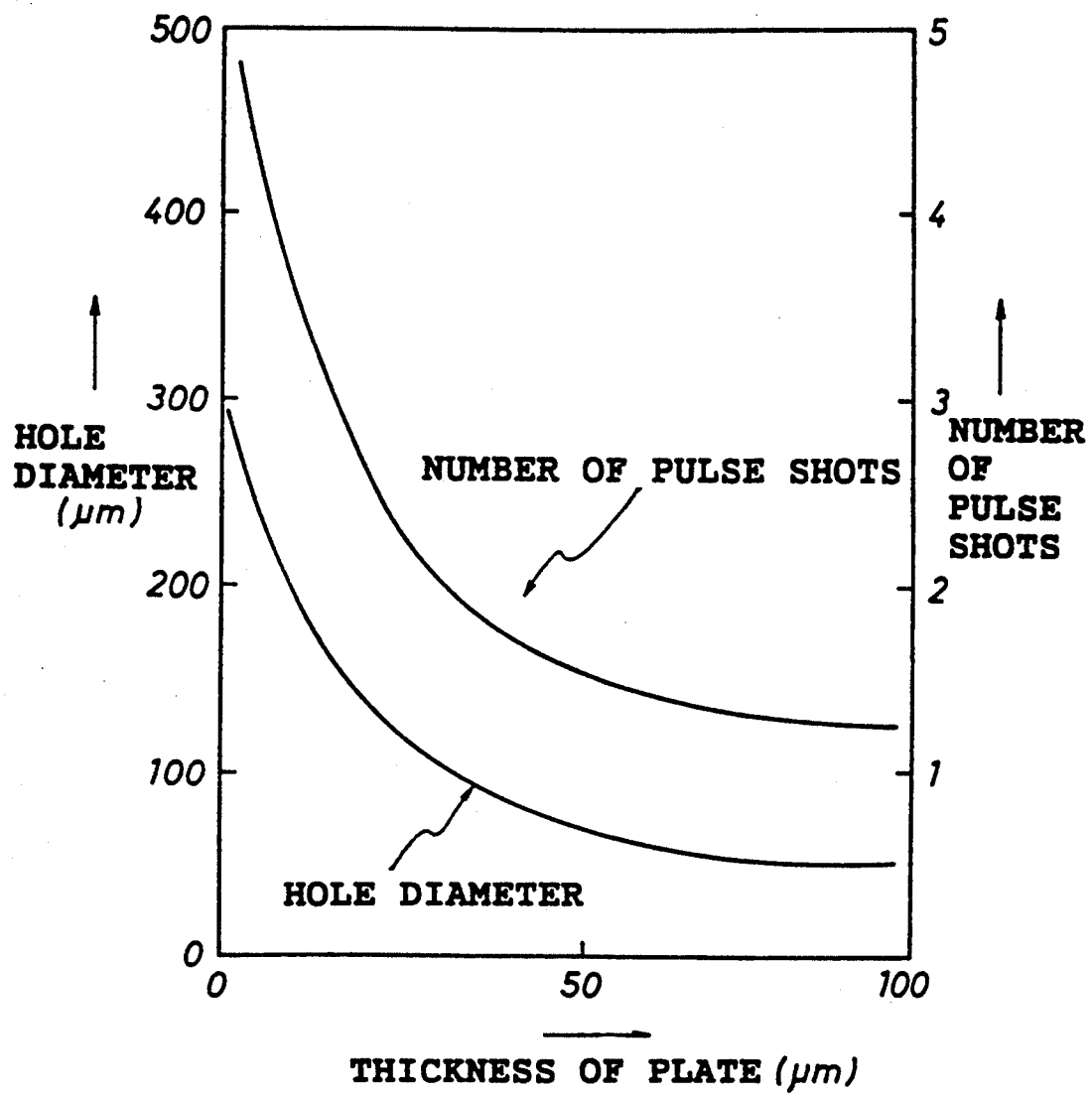
FIG. 6 is a graph showing the relationship between the thickness of the plate and the hole diameter, and between the thickness of the plate and a number of pulse shots.

When the CPU determines yes at the Step 106, the process ends. FIG. 5 shows the section of the orifice hole thus formed.

According to this embodiment in which the hole diameter changes from 300 μm to 50 μm, since the thickness of the plate 22 is 100 μm, the Step 104 is repeated twenty times. Thus, the number N is the number of times the Step 104 is to be performed to achieve the desired depth and is determined according to the thickness of the plate 22 and the depth of removal by the laser beam 2 per pulse.

The lens holder 11 may be lowered more or less than 5 μm in accordance with the configuration of the hole, the thickness of the plate 22, or other conditions. For example, the lens holder 11 may be lowered by 1 μm to form an orifice hole having a more smooth curve. In this case, the adjustment of the number of pulse shots in Step 104 is required.

Figure 8:
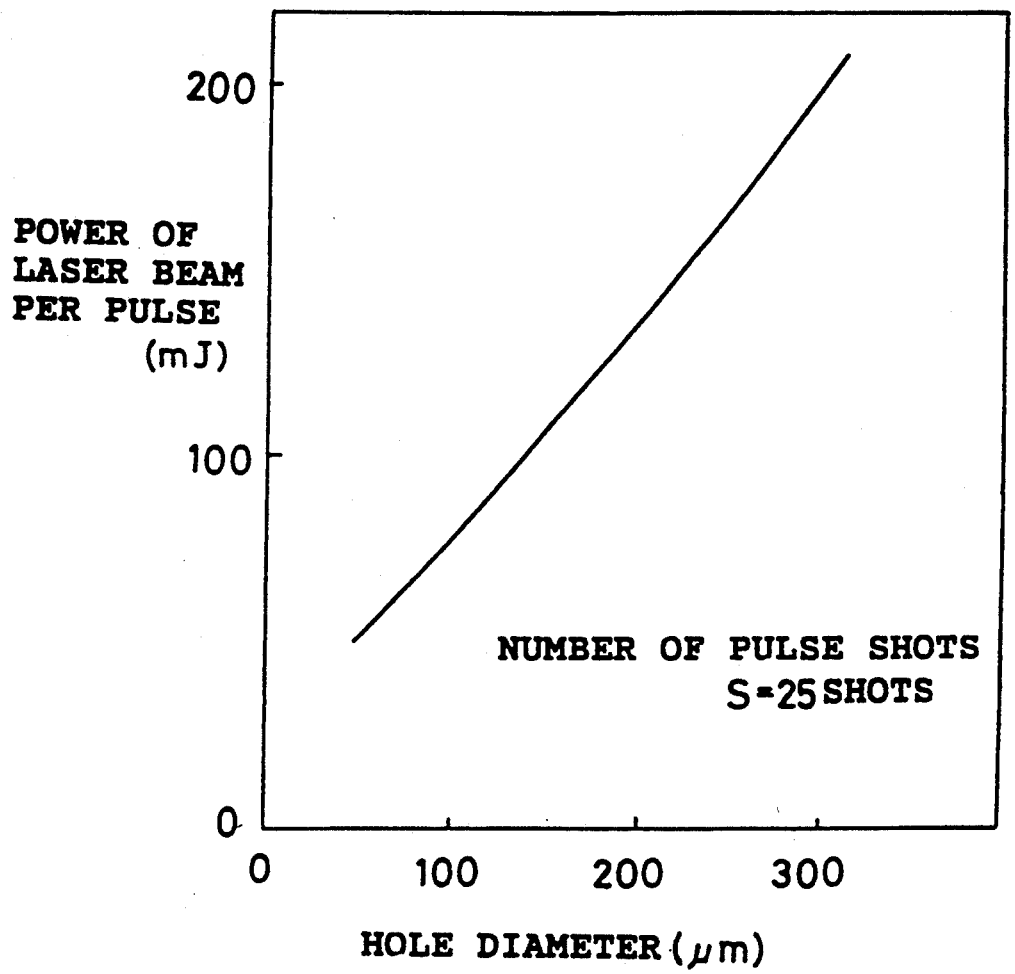
FIG. 8 is a graph showing the relationship between the hole diameter and the power of the laser per pulse with the number of pulse shots being fixed.

Further, instead of changing the number of pulse shots, the power of laser beam may be changed according to the hole diameter with the number of pulse shots being fixed. FIG. 8 shows the power of the laser beam 2 per pulse according to the hole diameter, in which the first number of pulse shots of twenty-times is fixed and the power of laser beam 2 is changed every time the lens holder 11 is lowered by 5 μm. The data of the power of laser beam 2 are stored in the RAM 28 as in the above case.

Moreover, when the depth of removal by the laser beam 2 per pulse is fixed, the depth of the orifice hole becomes deeper as the hole diameter becomes smaller. Therefore, the depth of removal per pulse is adjusted according to the hole diameter to fix the depth of the orifice hole.

The present invention may be subject to many modifications and changes without departing from the spirit or essential characteristics thereof. For example, the plate 22 may be put on a numerically controlled table (NC table), which is moved in the direction of the z axis to change the spot diameter of the laser beam 2. Further, YAG laser or alexandrite laser may be employed as the laser beam 2 instead of the excimer laser.

As aforementioned, the device for manufacturing a nozzle of the present invention changes the spot diameter of the laser beam 2 on the plate 22. Therefore, the time period for forming the orifice hole can be shortened.

What is claimed is:

1. A method for manufacturing a nozzle comprising the step of:
   gradually changing a spot diameter of a laser beam impinging on a plate in which an orifice hole is to be formed according to a required hole size.

2. A method for manufacturing a nozzle comprising the steps of:
   setting penetration parameters for manufacturing said nozzle;
   impinging a laser beam on a plate in which a nozzle is to be formed;
   determining the beam characteristics of said laser beam on said plate;
   comparing said beam characteristics to said penetration parameters; and
   controlling said beam characteristics according to said comparing step to achieve said penetration parameters.

3. The method of claim 2, wherein the determining step includes determining a spot diameter of said beam and said comparing step includes comparing the spot diameter determined in the determining step to a spot diameter specified according to said penetration parameters set in said setting step.

4. The method of claim 3, further comprising the step of:
   pulsing said laser beam for a defined number of pulse shots to remove a penetration depth of plate material from said plate according to penetration parameters comprising said spot diameter.

5. The method of claim 4, wherein said penetration parameters further comprise a laser type employed to produce said laser beam.

6. The method of claim 4, wherein said penetration parameters further comprise a material type of said plate material.

7. The method of claim 4, further comprising the step of:
repeating said changing and pulsing steps to form said orifice hole, said orifice hole having an orifice depth based on a summation of the penetration depths of said repeated pulsing steps.

8. The method of claim 4, further comprising the step of:
repeating said changing and pulsing steps to form said orifice hole, said orifice hole having an orifice depth based on a summation of the penetration depths of said repeated pulsing steps, and said orifice hole having a predetermined taper based on said spot diameters and said penetration depths of said repeated changing and pulsing steps.

9. The method of claim 2, wherein the determining step includes determining focus of said beam and said comparing step includes comparing the focus determined in the determining step to a focus specified according to said penetration parameters set in said setting step.

10. The method of claim 2, wherein the determining step includes determining pulse number to depth of said beam and said comparing step includes comparing the pulse number to depth determined in the determining step to a pulse number to depth specified according to said penetration parameters set in said setting step.

11. The method of claim 2, wherein the setting step includes setting penetration parameters according to plate material and orifice configuration of said nozzle.

12. The method of claim 2, wherein the determining step includes determining laser beam power of said beam and said comparing step includes comparing the laser beam power to a laser beam power specified according to said penetration parameters set in said setting step.

13. The method of claim 2, wherein the determining step includes determining spot diameter of said beam and said comparing step includes comparing the spot diameter determined in the determining step to a spot diameter specified according to a required hole size set in said setting step.

14. A device for manufacturing a nozzle comprising:
laser beam generating means for generating a laser beam;
detecting means for determining nozzle forming beam characteristics of a laser beam generated by said generating means and for sending a signal according to said characteristics; and
controlling means for controlling said laser beam generating means according to said signal from said detecting means.

15. The device of claim 14 further comprising:
means for pulsing said laser beam for a defined number of pulse shots to remove a penetration depth of plate material from said plate according to penetration parameters comprising said spot diameter.

16. The device of claim 15 further comprising:
means for repeatedly activating said means for changing and pulsing to form said orifice hole, said orifice hole having an orifice depth based on a summation of the penetration depths produced by said repeatedly activated means for pulsing.

17. The device of claim 16 wherein said means for changing comprises:
a lens for focusing said laser beam on said plate;
a work head comprising said lens; and
driving means for moving said lens relative to said plate.

18. The device of claim 16 wherein means for pulsing comprises:
a lens for focusing said laser beam on said plate;
position detecting means for producing a distance signal indicating a distance between said lens and said plate; and
controlling means for controlling said laser beam generating means so as to determine said defined number of pulse shots according to said distance signal.

19. The device of claim 15, wherein the number of pulse shots is changed in accordance with the change of the hole diameter of the orifice hole based on a predetermined simulation with the power of the laser beam being fixed.

20. The device of claim 15, wherein the power of laser beam is changed in accordance with the hole diameter of the orifice hole based on a predetermined simulation with the number of pulse shots being fixed.

21. The device of claim 14, wherein said controlling means comprises a means for changing the spot diameter of said laser beam.

22. The device of claim 14, further comprising setting means for setting nozzle forming beam characteristics for manufacturing said nozzle.

23. The device of claim 22, wherein the controlling means further comprises comparing means for comparing detected nozzle forming beam characteristics detected by the detecting means with set beam characteristics set by the setting means to determine said signal to said controlling means.

24. A jet nozzle comprising an orifice hole manufactured by the method of claim 1.

* * * * *